Figure 2:
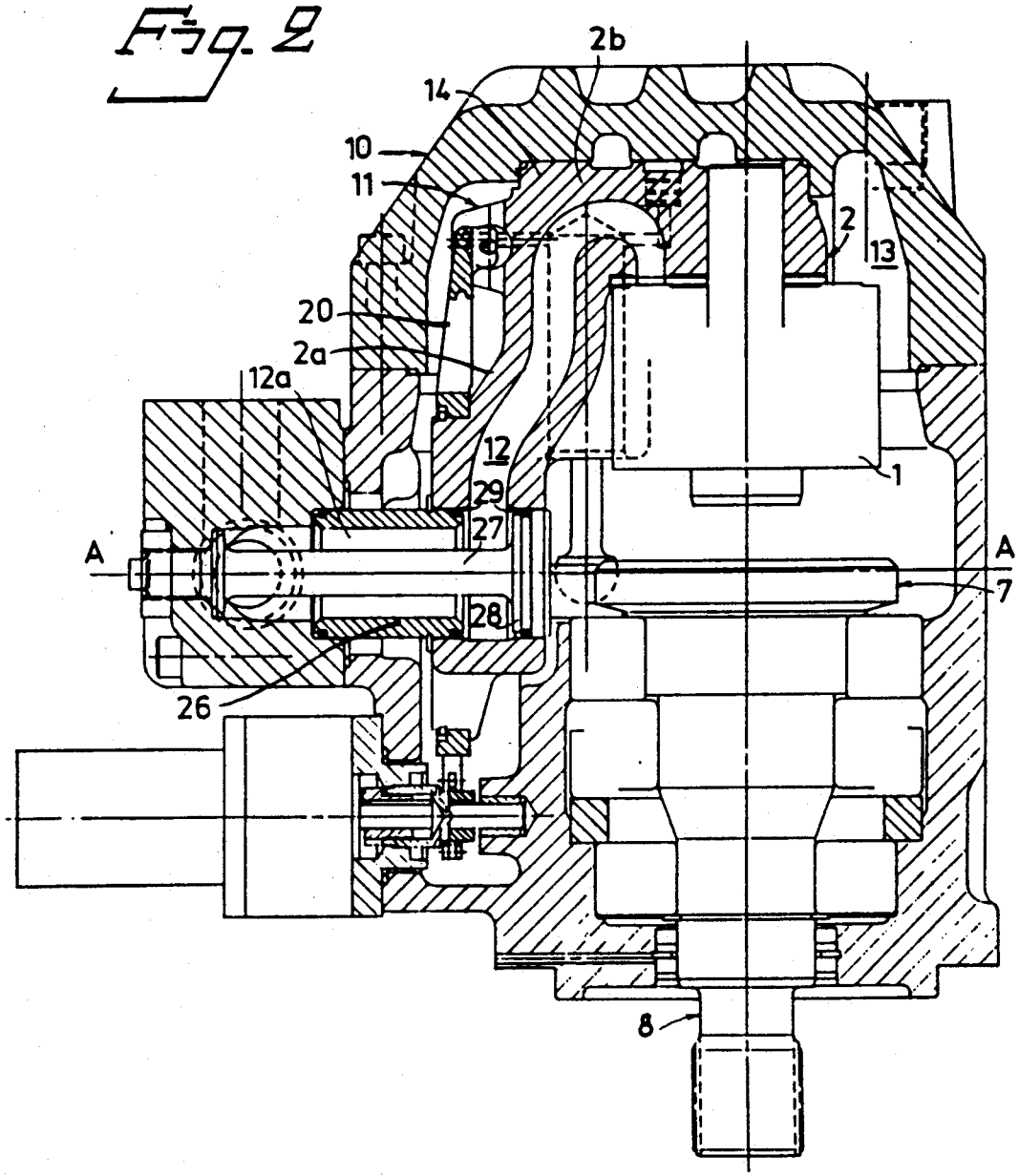

United States Patent [19]

Johansson

[11] Patent Number: 5,029,880
[45] Date of Patent: Jul. 9, 1991

[54] PRESSURE SEALING DEVICE FOR THE GAP BETWEEN TWO COAXIAL CYLINDRICAL SURFACES

[75] Inventor: Ingvar Johansson, Lilla Edet, Sweden

[73] Assignee: Volvo Hydraulik AB, Trollhattan, Sweden

[21] Appl. No.: 442,274

[22] Filed: Nov. 28, 1989

[30] Foreign Application Priority Data

Nov. 30, 1988 [SE] Sweden .................................. 8804340

[51] Int. Cl.$^5$ ............................................... F16J 9/16
[52] U.S. Cl. ......................................... 277/193; 277/83; 277/174
[58] Field of Search ................... 277/193, 53, 83, 174, 277/236, 25, 74, 94, 173; 91/506

[56] References Cited

U.S. PATENT DOCUMENTS

| | | | |
|---|---|---|---|
| 2,259,197 | 10/1941 | Bilde | 277/174 |
| 3,371,616 | 3/1968 | Wahlmark . | |
| 3,373,999 | 3/1968 | Jepsen | 277/193 |
| 3,460,842 | 8/1969 | Pointer et al. | 277/174 |
| 3,540,746 | 11/1970 | Jepson | 277/193 |
| 3,667,867 | 6/1972 | Boydell et al. | 91/506 |
| 3,707,335 | 12/1972 | Barnard | 277/174 |
| 4,455,028 | 6/1984 | Johansson | 277/8.3 |
| 4,477,090 | 10/1984 | Johansson et al. | 277/83 |

FOREIGN PATENT DOCUMENTS

1083345  9/1967  United Kingdom ................ 277/174

*Primary Examiner*—William A. Cuchlinski, Jr.
*Assistant Examiner*—Daniel G. DePumpo
*Attorney, Agent, or Firm*—Pollock, Vande Sande and Priddy

[57] ABSTRACT

A device for sealing the gap between a substantially cylindrical outer surface of a body and a coaxially surrounding and substantially cylindrical wall surface against a fluid pressure, particularly hydraulic liquid pressure, which pressure is greater on one side of the device than on the other, comprising a peripheral groove made in one of said cylindrical surfaces and in which is inserted at least one slotted sealing ring having an edge surface which resiliently and sealingly engages a portion of the other cylindrical surface radially opposite to the peripheral groove, the one surface and the other surface being mutually static and/or rotatable and/or axially movable as well as arranged with comparatively great radial play, a non-slotted support ring being mounted at the low-pressure side of the slotted sealing ring. For obtaining an effective sealing action in spite of said radial play between the surfaces, the non-slotted support ring is mounted with smallest possible clearance to the other surface and extends partialy into the peripheral groove in the one surface, the slotted sealing ring furthermore having a required great play relative to the peripheral groove bottom in view of the radial gap between the surfaces.

3 Claims, 2 Drawing Sheets

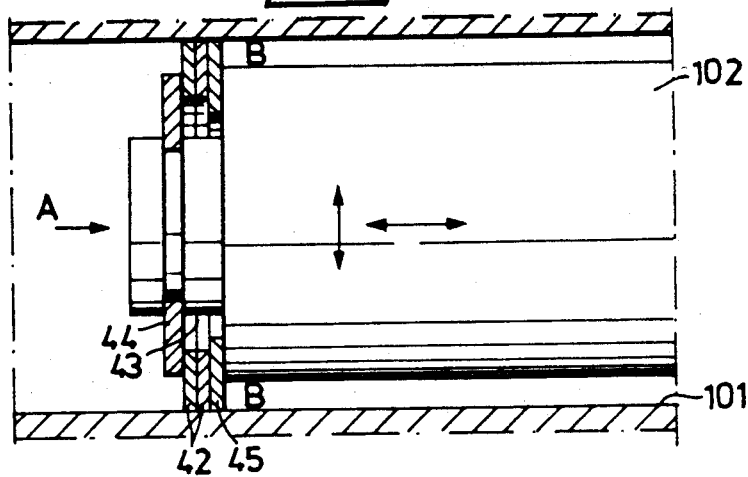
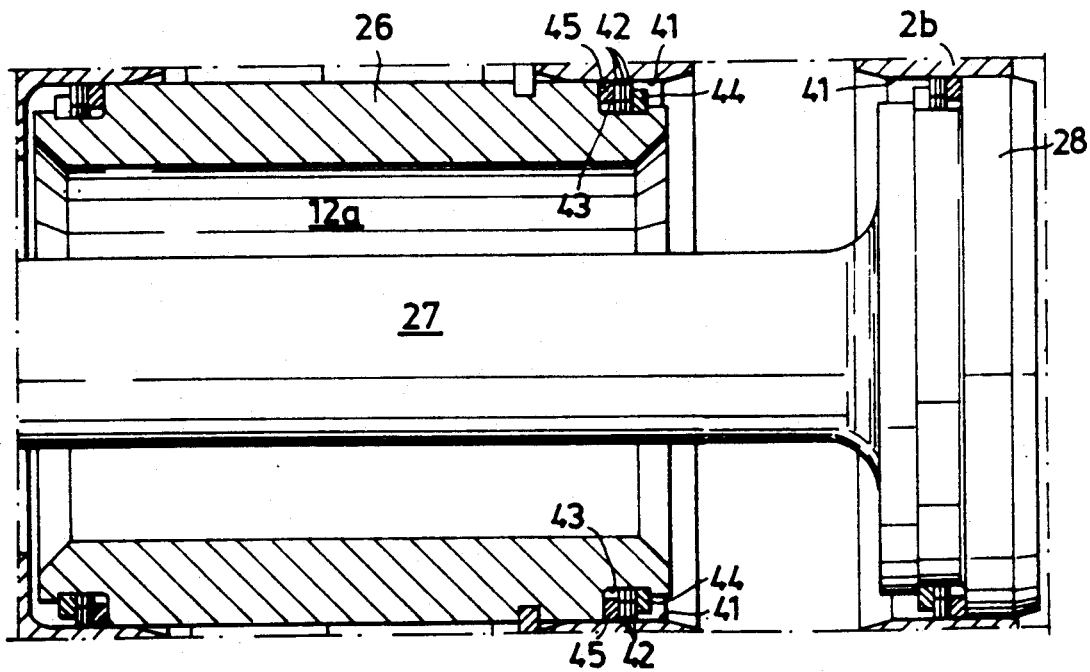

PRESSURE SEALING DEVICE FOR THE GAP BETWEEN TWO COAXIAL CYLINDRICAL SURFACES

The present invention relates to a device for providing a sealing action between a substantially cylindrical outer surface of a body and a coaxially surrounding and substantially cylindrical wall surface against a fluid pressure, particularly hydraulic liquid pressure, acting with a higher pressure on one side of the device than on the other, the device comprising a peripheral groove in one of the surfaces, in which groove is inserted at least one slotted sealing ring which resiliently and sealingly engages the other surface with its edge surface, which is radially opposite to the peripheral groove, the one surface and the other surface being mutually static and/or rotatable and/or axially movable as well as arranged with comparatively great radial play, a nonslotted support ring being mounted at the low-pressure side of the slotted sealing ring.

It has long been known to provide a seal between a rotatable and/or slidable cylindrical body such as a piston or an actuation rod relative to a surrounding wall surface or a bore in a machine casing or the like by means of slotted sealing rings. Attempts have been made to reduce the width of said slot in mounted condition to the absolute minimum value but still there remains a narrow gap between the ring ends. Even when using several slotted rings located adjacent each other a leakage through the ring slots cannot be completely avoided and this is the case particularly when the seal is subjected to very high hydraulic pressures of the order of magnitude of 500 bar or more. In certain applications it is of decisive importance that absolutely no noticeable leakage occurs in a sealing of this kind, e.g. when it comes to keeping a load supported at constant level for a long time by means of a hydraulic lifting device.

Furthermore, a pressure fluid-carrying conduit sometimes needs to be connected with an adjoining further pressure conduit pivotable at an angle thereto. Depending on the pressure of the fluid in the conduits and the type of structural design of the pivotable connection piece between the conduit, a plurality of different suggestions for sealing devices are known for preventing the fluid from leaking out from the joint. Most often relatively simple ring sealings might be sufficient, even at high fluid pressures, if the geometrical conditions are favorable to the pivotable joint between the conduits. As an example reference can be made to SE-B-320 269. In said publication an axial piston machine of so-called yoke type is illustrated, in which each leg of the yoke is pivotally connected through pivot pins on a pivot pin body, in which pins pressure fluid passages are arranged. In the pivotable connection between yoke leg and pivot pin angular sealing means are mounted which surround each pivot pin and act on the respective yoke leg wall surface. Said kind of sealing is relatively uncomplicated, however, in that the pivot axis for the yoke legs can be brought to coincide very precisely with the center axis of the pivot pins.

If, however, said last-mentioned condition is difficult to secure, e.g. if a yoke leg is to be mounted pivotable on a pivot pin made as a tubular shaft, where there is a risk that the center axis of the shaft and the yoke leg opening possibly are slightly laterally offset, such a known sealing ring device cannot be used, particularly in connection with such high fluid pressures of several hundred bar which occur in e.g. axial piston machines as mentioned.

The object of the present invention now is to suggest a sealing device of the aforementioned kind which allows movements axially as well as angularly but also radially. Particularly the invention aims at providing a sealing device which can accommodate the above-mentioned lateral offset position of the center axes in a pivotable tube connection of the aforementioned kind. The invention is substantially distinguished in that the supporting ring is non-slotted and mounted with smallest possible clearance to the other surface, said supporting ring furthermore extending a distance into the peripheral groove in the one surface, while the slotted sealing ring has a required great play to the peripheral groove bottom in view of the radial gap between the cylindrical surfaces.

By the invention it is now achieved that in the case of a pressure piston, which is axially movably mounted in a surrounding bore and at its peripheral surface is provided with a groove with slotted sealing rings seated therein, the precision machining of the piston head hitherto required can be omitted and the usual coarse machining may be utilized with accompanying comparatively great radial play relative to the surrounding wall of the bore. In the case with the pivotable tube connection such manufacturing tolerances which depend on discrepancies in the locations of the center axes of the tubular shaft and the conduit opening might be accommodated by the sealing device and a satisfactory sealing action obtained with an absolute minimum of leakage also for high fluid pressures of the order of magnitude of up to 500 bar.

By way of example the invention will be further described below with reference to the accompanying drawing in which FIG. 1 is a diagrammatic longitudinal section of a sealing device according to the invention as applied to a piston means which is arranged with great radial play in a surrounding cylindrical bore, FIG. 2 is a lateral view partly in section of an axial piston machine, in which the invention is applied, and FIG. 3 is a longitudinal section of the yoke leg support shaft with the inventive sealing device mounted thereon.

In FIG. 1 the principle of the present invention is disclosed. In a cylindrical bore 101 a piston member 102 is located with great radial play relative to the wall of the bore as a result of which the piston member 102 is slightly movable in the transverse direction of the bore. In such movements the center axes of the bore 101 and the piston 102 do not always coincide completely but sometimes lie mutually slightly laterally offset. The piston member 102 may be statically mounted in the bore 101 but usually said member 102 is axially movable and/or rotatable about its own longitudinal axis therein. In the end of the piston member 101 facing a pressure fluid in the bore 101 a peripheral groove 43 is made, in which at least one radially slotted sealing ring 42, preferably of metal, is seated. The outer peripheral surface of ring 42 resiliently engages the wall of the bore 101 to provide a sealing action at its outer edge surface against the cylindrical bore wall. Ring 42 has a required great radial play relative the bottom of the peripheral groove 43 in view of the play between the piston member and the wall of the bore. On the side of the sealing ring 42 remote from the pressure side A, thus facing the low-pressure side B, is mounted according to the invention a support ring 45, which is non-slotted, covers the slot in the adjacent sealing ring 42, and has closest possible clearance to the surrounding wall of the bore. The support ring 45 has sufficient rigidity to provide axial support for the sealing ring 42 and also extends a distance radially into the peripheral groove 43. Usually two or three slotted sealing rings 42 adjacent each other are used, but even when the slots of the individual rings 42 do not coincide mutually but are distributed circumferentially a certain through-flow of hydraulic liquid can be avoided, particularly hydraulic pressures of 200-500 bar, only by the mounting of the non-slotted support ring 45 which provides a sealing action on its two opposite side surfaces but not on its inner and outer end surfaces. Thus, the support ring 45 is of decisive importance for the good and advantageous function of invention. At the high-pressure side A of the sealing ring 42 a locking ring 44 may be mounted, if desired. It is to be pointed out in this connection that the described principle also can be applied in its technical inversion, namely in that the sealing rings 42 and the support ring 45 are arranged in a peripheral groove 43 in the bore 101, acting against a smooth piston member 102 or a smooth shaft.

Although the invention might find a number of other applications the same will be described here only in connection with its use in a variable displacement hydrostatic axial piston machine. As evident from FIGS. 2 and 3 of the drawing such a machine comprises a cylinder barrel 1 which is rotatably mounted in a yoke 2. As known, said barrel 1 has a plurality of circumferentially spaced cylinders with reciprocatingly mounted pistons therein. Each piston is rigidly secured to and preferably made integral with an associated piston rod, the other end of which is made spherical and in a known way journalled in a drive disk which is rigidly secured to a machine shaft 8. With a leg 2a the yoke is journalled in a casing 10 of the machine in such a way that the yoke is reciprocatingly pivotable about a transverse axis A—A through the guide disk center by means of an adjustment device 11 for varying the displacement and in this case also for shifting the functional mode of the machine between pump and motor. In the yoke 2 and the machine casing 10 there is furthermore arranged in a usual way a pair of connection conduits 12, 13 for hydraulic fluid.

The other leg of the yoke 2 is completely omitted in the construction according to the invention and replaced by a guiding segment 14 disposed on the top or center portion 2b of the yoke, said guiding segment being intended to run in a curved guide path in the machine casing in a plane perpendicular to the pivot axis A—A of the yoke 2. The connecting conduit 12 for supplying hydraulic fluid to the cylinder barrel 1 is arranged in a known manner in the yoke leg 2a while another fluid conduit is formed by the hollow space 13 in the machine casing 10.

The connecting conduit 12 for hydraulic fluid which leads to the yoke 2 through the leg 2a thereof, comprises an annular conduit portion 12a located coaxially with the yoke pivot axis A—A. Outwardly said portion is defined by a tubular member 26 which is connected to the maching casing 10 and inwardly said annular conduit portion is defined by a yoke support shaft 27, which shaft also is secured to the casing 10 and at its free end is formed with a circular end plate 28. Said plate has substantially the same diameter as the outer diameter of the tubular member 26 and is located at a distance from the free end of said member 26 which substantially corresponds to the cross-sectional dimension of the conduit 12 as seen in the direction of said pivot axis A—A. In this case the leg 2a of the yoke is rotatably supported in a transversal opening 41 by the tubular member 26 and by the shaft end plate 28 and sealed thereagainst by means of sealing devices according to the present invention.

More closely, the sealing device according to the invention comprises sealing means in the form of at least one radially slotted sealing ring 42 of metal, which with its outer peripheral surface resiliently engages the wall of the transversal opening 41 in the leg 2a. The sealing ring 42 is arranged with internal radial play in a ring groove 43 made on the outer surface of the tubular shaft 26, 28. In said ring groove there is furthermore mounted a locking ring 44 on the side of the sealing ring 42 facing the conduit 12 in leg 2a, while on the other side of the sealing ring 42 a non-slotted support ring 45 is seated. Said support ring 45 engages with its outer peripheral surface against the wall of the transverse opening 41 in the leg 2a and extends radially inwardly a distance into the ring groove 43 in the tubular shaft 26, 28. Owing to the fact that the sealing ring 42 lies in the opening 41 with radial play inwardly towards the bottom of the ring groove 43 at the same time as the non-slotted support ring 45 also engages the wall of the transverse opening but extends radially inwardly a distance into the ring groove 43 of the tubular shaft, the device can accommodate lateral displacements or non-coinciding conditions of the axes of the tubular shaft 26, 28 and the opening 41 in the leg 2a.

For obtaining a satisfactory sealing action it is suitable that the device comprises several sealing rings 42, preferably three rings, and that said rings are formed with small thickness relative the radial width, i.e. have the shape of washers. Particularly with one slotted sealing ring 42, but also when using three rings of this kind, leakage possibly occurring through the ring slots will be effectively stopped by the non-slotted support ring 45. Said ring 45 like the locking ring 44 is preferably also made of metal similar to the sealing ring or rings 42.

Also in this application the technical inversion is fully plausible, i.e. in that the ring groove 43 is made in the wall of the transverse opening 41 in the leg 2a while the sealing ring 42 and support ring 45, respectively, located in said groove, engage the outer surface of the tubular shaft 26, 28.

Usually the effective edge or peripheral surface of the support ring 45 is straight circular cylindrical in the above-stated embodiment but it may also be slightly conical or conically chamfered for allowing a small inclination angle between the center axes of the bore and the piston member.

I claim:

1. A device for sealing the gap between a substantially cylindrical outer surface of a body and a coaxially surrounding and substantially cylindrical wall surface against a fluid pressure, particularly hydraulic liquid pressure, which pressure is greater on one side of the device than on the other, comprising a peripheral groove made in one of said cylindrical surfaces and into which is inserted at least one annular slotted sealing ring which has an outer edge surface that resiliently and sealingly engages a portion of the other cylindrical surface radially opposite to the peripheral groove to provide an axial seal between said edge surface and said portion of said other cylindrical surface, the said two cylindrical surfaces being rotatable relative to one another and also being capable of exhibiting radial play relative to one another, and an annular support ring mounted in radial sealing engagement with said slotted sealing ring at the low-pressure side of the slotted sealing ring, said support ring being non-slotted and being mounted with a small clearance between the outer edge surface of said support ring and said other cylindrical surface, each of said annular rings extending only partially into the peripheral groove in the one cylindrical surface whereby the inner edge surfaces of both annular rings are spaced from the bottom of said peripheral groove, the radial width of said support ring being greater than the radial width of said slotted sealing ring whereby the spacing between the inner edge surface of said slotted sealing ring and the peripheral groove bottom is greater than the spacing between the inner edge surface of said support ring and the peripheral groove bottom when said cylindrical surfaces are in coaxial relation to one another, said slotted sealing ring having significant play relative to the peripheral groove bottom related to the radial play between said cylindrical surfaces, and the radial surface of said support ring covering the slot in said slotted sealing ring at all positions of said play of said slotted sealing ring relative to the peripheral groove bottom.

2. A device according to claim 1 mounted between a fluid-carrying cylindrical hollow shaft and a conduit at an angle thereto, said conduit being pivotally mounted on said hollow shaft and having a wall that defines a transverse opening which connects at least one peripheral opening in said hollow shaft with the interior of the conduit, said device comprising at least one radially slotted metallic sealing ring mounted on the cylindrical shaft and having an outer peripheral surface which resiliently engages a portion of said wall defining the transverse opening in the conduit, said slotted sealing ring being mounted with internal radial play in a ring groove made in the outer surface of the tubular shaft, said groove having mounted therein a locking ring on the side of the sealing ring facing the interior of the conduit, said non-slotted support ring being located on the other side of said sealing ring with its radial outer surface engaging another portion of said wall and extending radially inwardly a distance into the ring groove of the tubular shaft, whereby the device is adapted to accommodate lateral discrepancies in the positions of the center lines of the tubular shaft and the opening in the conduit, respectively.

3. A device according to claim 2 wherein three slotted sealing rings, each of which has a small axial thickness relative to its radial width, are disposed in side-by-side engagement with one another in said ring groove between said locking ring and said support ring.

* * * * *